(No Model.) 2 Sheets—Sheet 1.

E. B. EDDY, G. H. MILLEN & E. MOUSSEAU.
APPARATUS FOR DIPPING MATCHES.

No. 313,064. Patented Mar. 3, 1885.

Witnesses:
John Grist
R. P. King

Inventors:
E. B. Eddy
G. H. Millen
E. Mousseau
By Henry Grist
Attorney.

(No Model.) 2 Sheets—Sheet 2.
E. B. EDDY, G. H. MILLEN & E. MOUSSEAU.
APPARATUS FOR DIPPING MATCHES.
No. 313,064. Patented Mar. 3, 1885.
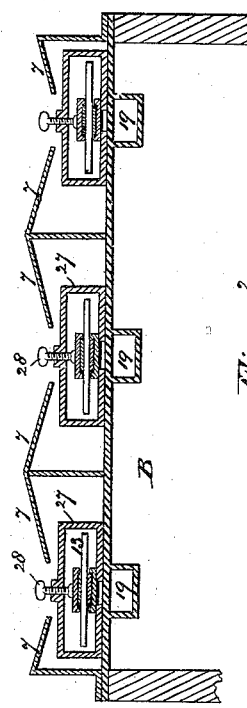
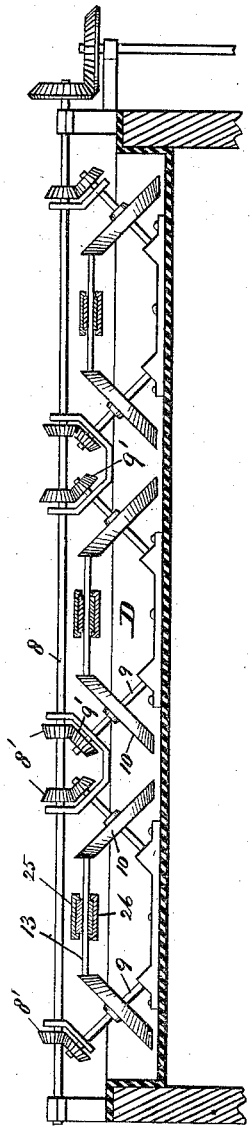
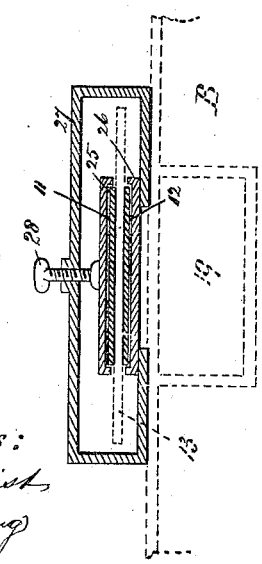
Witnesses:
John Grist
R. P. King
Inventors:
E. B. Eddy
G. H. Millen
E. Mousseau
By Henry Grist
Attorney.

United States Patent Office.

EZRA B. EDDY, GEORGE H. MILLEN, AND EDWARD MOUSSEAU, OF HULL, QUEBEC, CANADA.

APPARATUS FOR DIPPING MATCHES.

SPECIFICATION forming part of Letters Patent No. 313,064, dated March 3, 1885.

Application filed November 1, 1884. (No model.)

*To all whom it may concern:*

Be it known that we, EZRA BUTLER EDDY, GEORGE HENRY MILLEN, and EDWARD MOUSSEAU, all of Hull, in the county of Ottawa, in the Province of Quebec, in the Dominion of Canada, have jointly invented certain new and useful Improvements on Match-Dipping Apparatus; and we do hereby declare that the following is a full, clear, and exact description of the same, reference being had to the annexed drawings, in which like letters of reference indicate corresponding parts in all the figures.

Our invention relates to improvements in apparatus patented to George H. Millen, Joseph H. Mantion, Felix Labelle, and Thomas A. Cook, July 3, 1883, and has for its object to improve the feed mechanism and the endless apron carrying the splints, and also the drying-chambers and the phosphorizing-rollers, whereby the splints will be uniformly fed, carried, dried, adjusted, and dipped simultaneously, as hereinafter described.

Our invention consists in providing the feed-hopper with a longitudinally-grooved roller to feed the splints uniformly, and a reciprocating sliding side to shake the splints, whereby they will be taken up by the feed-roller; also, of two endless plain belts running one above the other and closely together over the furnace, pans, &c., to hold and carry the splints fed from the hopper while being dried, sulphurized, phosphorized, cooled, and cut through the middle to make two matches, said belts passing between adjustable guides to regulate the distance apart and to prevent sagging; also, providing the phosphorizing-pan with beveled-edge rollers hung on inclined spindles geared together, whereby the splints will be dressed into line to receive the compound and be cut through the middle to make matches of exact length.

Figure 1:
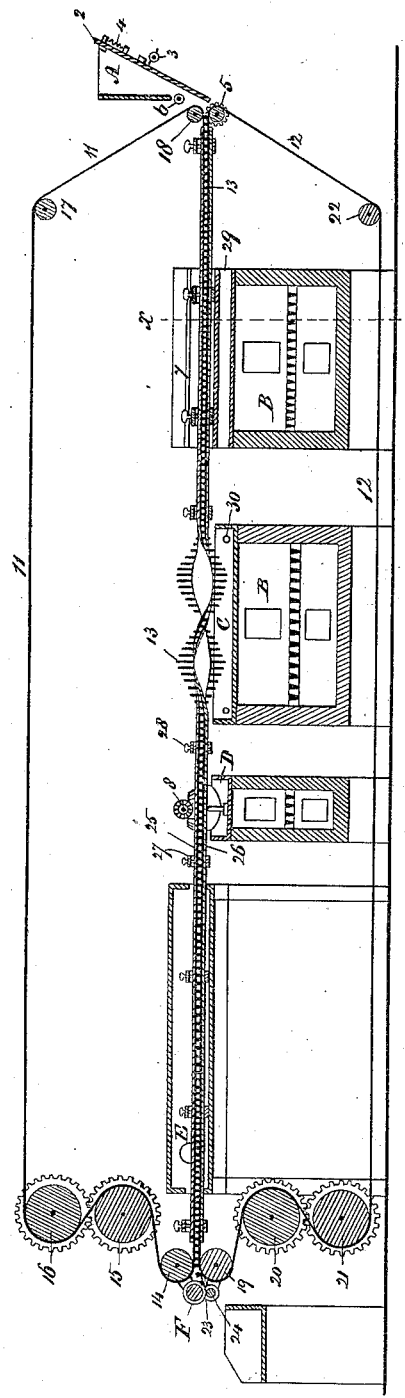
Figure 2:
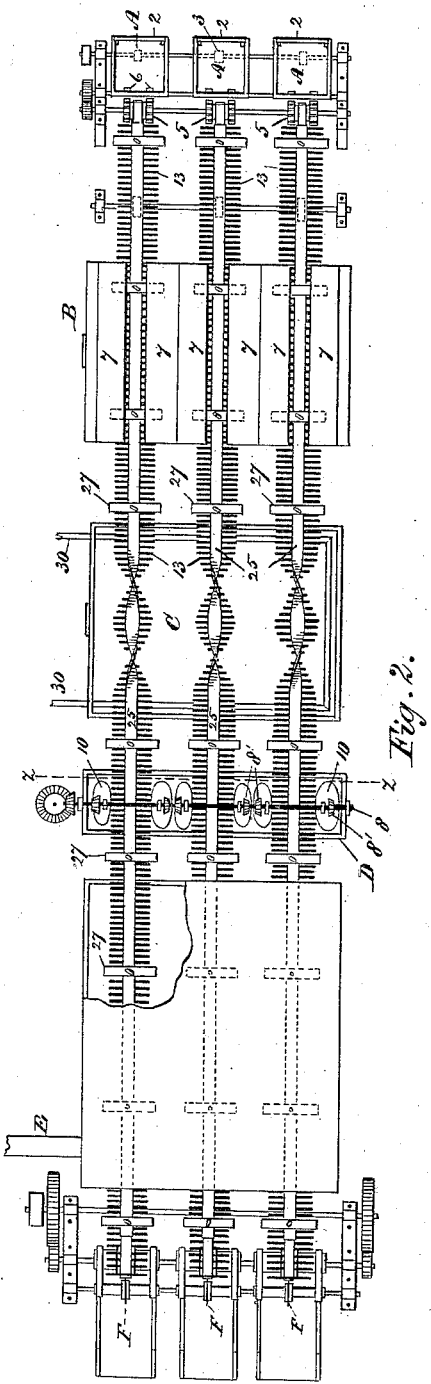

Figure 1 is a longitudinal vertical section of our improved apparatus. Fig. 2 is a top view of a set of three apparatuses. Fig. 3 is a vertical cross-section on line $x\ x$, Fig. 1. Fig. 4 is a transverse vertical section of the two endless aprons or belts, running one above the other in guides or ways, and clamps with screws to regulate the belts to the required distance apart for a portion of their length; and Fig. 5 is a sectional elevation of the phosphorizing-pan, on line $z\ z$, Fig. 2, showing the transferring-wheels.

A is a hopper, into which the match-splints are promiscuously placed.

B is a block of furnaces for heating the sulphur-pan C and drying the ends of the splints before dipping.

D is a phosphorizing-pan; E, a cold-blast pipe for cooling the ends of the phosphorized splints, and F a rotary knife operating to cut the splints to make two matches, all of said portions of the apparatus being substantially as described in the before-mentioned patent. The hopper A has a sliding side, 2, which is reciprocated by a tripping-wheel, 3, and spring 4, to agitate the splints, whereby they will be shaken compactly together.

5 is a longitudinally-grooved feed-roller at the outlet of the roller, and 6 is a roller to keep the splints to be taken up by the feed-roller from falling through the throat more than one at a time.

7 are roofs standing upon and over the furnaces, and project so as to cover the ends of the splints, to keep down the heat drying the splints before it escapes at the eaves. These roofs are placed at a distance apart to allow the splint-carrying belts, hereinafter referred to, to run interveningly, whereby the said belts, when empty and idle, can be raised to be unaffected by heat.

8 is a shaft over the phosphorizing-pans D, and is provided with bevel gear-wheels 8', meshing with like wheels, 9', on inclined spindles 9, carrying beveled wheels 10, which rotate against the ends of the splints, and move endwise those that may be uneven or out of place, and thereby bring the ends uniformly in line, whereby the splints will be cut by the circular knife F, to make two matches of equal length. Said wheels also at the same time transfer the phosphorizing compound in the pans D to the ends of the splints.

11 12 are endless belts or aprons, running horizontally, parallel, and closely together one above the other, for that portion of their length over the furnaces, pans, and between the cold-blast pipes, said belts carrying interveningly the splints 13, discharged from the grooved feed-roller 5 at the outlet of the hopper, and when near the rotary cutter F separate, belt 11 passing over pulleys 14 15 16 above one end of the apparatus, and returning over pulley 17 above the opposite end, and thence downwardly around a pulley, 18, near the outlet of the hopper. Belt 12 passes over pulleys 19 20 21 below the end of the apparatus, and returns over pulley 22 below the hopper, and thence over a pulley portion of feed-roller 5, rotating it, and receiving the splints falling from the said roller, which splints are then carried by said belt 12 between both belts interveningly to the drying-chambers, pans, blast-pipe, and discharged into a chute, 23, to be cut by the rotary knife which runs in a peripheral kerf in a roller, 24, at the foot of the chute. The belts for that portion of their length carrying the splints run in guides 25 26 in clamp-frames 27, placed at suitable distances apart between the hopper and the cutter, the lower guides bearing on the bottom of the clamp-frames, and the upper guide suspended from the top of the clamp-frames by a set-screw, 28, whereby the upper guide may be adjusted to widen and close the space intervening the belts to suit the splints, so that they will be held by compression of the belts. The clamp-frames above the sulphur-pan are placed inclinedly, so as to cant the belts nearly perpendicularly edgewise, whereby both ends of the splints will be dipped alternately into the melted sulphur. The belts 11 12 are preferably made of either asbestos or cotton and faced with felt, but other suitable material giving a frictional surface may be used.

29 are cold-air ducts in the furnace-block, to prevent heat striking directly against the lower belt.

30 are pipes passing through the sulphur-pan, to connect with a steam-boiler, for keeping the sulphur at a higher temperature than could be obtained by heat from a furnace without being burned and consequently discolored. A slow fire is first made to melt the sulphur, and afterward the requisite degree of liquefaction is obtained by heat from the steam-pipes. A slow fire is sufficient to dry the splints, and an intense fire would injure the belts and blacken the sulphur; hence the great advantage of liquefying the sulphur by steam-pipes passing through the pans.

We claim as our invention—

1. In a match-machine, the combination, with the hopper and the drying, dipping, heading, and cooling devices, arranged in alignment, as set forth, of the feed-roller 5 and endless belts or aprons 11 12, traveling contiguously in a horizontal parallel plane for a portion of their length between guides 25 26, adjustable in frames 27 by set-screws 28, as set forth, for the purpose described.

2. In combination with the furnace-block, the roof 7 to cover the ends of the splints, and having an opening to permit the belts 11 12 to be raised out of influence of heat from the furnaces, as set forth.

3. The combination, with the phosphorizing-pan D, of shaft 8, bevel gear-wheels 8' 9', and inclined spindles 9, provided with bevel-edged wheels 10, to adjust the splints uniformly endwise simultaneously with transferring the phosphorizing compound to the ends of the splints, whereby the splints may be subsequently cut by a rotary knife to make two matches of equal length, as set forth.

4. In feed-hoppers for match-dipping machines, substantially as described, the movable side 2, operated reciprocally by the revolving trip 3 and spring 4, to shake the splints compactly together, as set forth.

5. In a match-dipping apparatus, substantially as herein set forth, and in combination with the belts 11 12, the clamp-frames 27, set-screw 28, and guides 25 26, to cant, guide, and regulate the closeness of the belts to carry the splints, as described.

E. B. EDDY.
GEO. H. MILLEN.
ED. MOUSSEAU.

Witnesses:
E. D'ODET D'ORSONNENS,
JOHN GRIST.